Patented Feb. 8, 1949

2,461,455

UNITED STATES PATENT OFFICE 2,461,455

MANUFACTURE OF LUBRICATING OIL

Fred C. Toettcher, Fishkill, N. Y., assignor to The Texas Company, New York, N. Y., a corporation of Delaware No Drawing. Application May 4, 1945, Serial No. 592,056

2 Claims. (Cl. 196—147)

This invention relates to the treatment of hydrocarbon oils to produce lubricating oil highly resistant to oxidation. The invention relates to improvements in the treatment of lubricating stocks to effect increase in oxidation stability and to produce oils of highly stable character adapted for turbine oils, lubricating oils for internal combustion engines and the like.

The invention is concerned with the solvent and catalytic treatment of lubricating oil to effect improvement in the oxidation stability of the oil. In accordance with the invention the oil is treated with certain selective solvents which function to segregate components which are particularly susceptible to the catalytic treatment and the components thus segregated are subjected to catalytic treatment in contact with certain catalysts under such conditions of temperature that reactions occur which produce pronounced increases in the oxidation stability of the oil. In the catalytic treatment of the constituents segregated or concentrated by the solvent reactions are effected in which the structures of the lubricating oil molecules which are relatively unstable to oxidation are modified to more stable structures and especially to structures which inhibit the oxidation of lubricating oil. Thus in accordance with the invention the lubricating oil is subjected to solvent extraction with certain solvents, such as acetone and furfural, the extract fractions are subjected to the catalytic reaction and constituents obtained from the catalytic treatment are blended with the raffinate oil or with other lubricating oil to effect an increase in the oxidation stability thereof.

The catalysts which produce the increase in oxidation stability comprise certain composites of silica and alumina and include generally the activable clays, particularly the non-swelling, acid-treated montmorillinite or bentonitic clays. Industrial activated clays which have been found particularly effective for the practice of the invention are Super Filtrol and Lena Clay, each of which is a non-swelling, acid-treated bentonitic clay.

In the treatment to effect the increase in oxidation stability the lubricating stock is contacted with the catalyst in pulverulent, comminuted or powdered form at temperatures upwards of 600° F. In order to obtain the maximum improvement in oxidation stability without undue loss in product, due to conversion into lower boiling products than desired for the lubricating oil product, the most satisfactory temperature is within a range of about 650–725° F. with a period of reaction of about one-half an hour up to one or two hours. It is desirable that the treatment be conducted with the oil essentially in the liquid phase. Moreover if the temperature is increased above the preferred range there is danger of having extensive cracking at the expense of the desired selective catalytic conversion. Consequently in order to avoid cracking into low boiling components, such as gasoline, the upper limit of the temperature of treatment for the lubricating oil stocks is about 750° and generally a temperature of about 650–725° F. is the most satisfactory. For the most effective operation the quantity of catalyst used should be about 8–10% by weight of the oil treated or greater proportions up to around 20%.

In an example the invention was applied to the treatment of a lubricating distillate from a Gulf Coast naphthene base crude. The distillate from the crude stills was rerun with caustic soda in vacuum distillation, a pale oil stock of 500/100° F. Saybolt Universal Viscosity being taken as one of the fractions. The pale oil distillate was solvent refined with liquid sulfur dioxide and then treated with sulfuric acid and neutralized to produce a refined lubricating oil which had an A. S. T. M. Oxidation Stability test of 75. This oil was subjected to solvent extraction with acetone, using an acetone-oil ratio of 10:1 and a temperature of 20° F. below zero. The acetone-oil extract mixture was vacuum distilled to remove the acetone. A yield of 30% extract and a 70% raffinate was obtained. The extract fraction was subjected to catalytic treatment with 10% by weight of Super Filtrol at a temperature of 600° F. for a period of one and one-half hours. The product was stripped by vacuum distillation to raise the viscosity to that of the extract fraction before the catalytic treatment. The A. S. T. M. Oxidation Stability test of the stripped product was 350 hours. This product when blended with untreated raffinate in the proportion of 70% raffinate and 30% stripped catalytically treated extract produced a product having an A. S. T. M. Oxidation Stability test of 594 hours, thus showing that the catalytic treatment of the extract fraction produced constituents functioning to inhibit oxidation. When raffinate obtained as described was subjected to catalytic treatment under the same conditions as were applied to the extract fraction and the resulting product stripped to raise the viscosity to that of the raffinate fraction before the catalytic treatment it was found that the A. S. T. M. Oxidation Stability test of the raffinate product was 250 hours. The experiments thus indicated not only that the extract fraction was more susceptible to improvement in oxidation stability by catalytic treatment but that the catalytic treatment of the extract produced constituents having a pronounced inhibiting effect when blended with untreated lubricating oil.

The invention is adapted for the treatment of either raw lubricating stocks or refined stocks in so far as effecting improvement in oxidation stability is concerned. However in the treatment of oils for certain purposes, such as turbine oils, the sequence in which the catalytic treatment is applied is of a critical nature. Thus in the production of turbine oils which are required to have a high oxidation stability and also must be resistant to emulsion or must readily separate from emulsions which may be produced in the use of the oil, it is desirable that the catalytic treatment be applied after the oil has been subjected to refining treatments such as acid treatment and solvent refining. After-treatments such as acid treatment, solvent refining, caustic washing and similar treatments while functioning generally to improve the emulsion characteristics of the oil tend to greatly reduce the oxidation stability imparted to the oil by the catalytic treatment. Accordingly in the production of an oil which will have both high oxidation stability and good emulsion characteristics, the raw lubricating stock is first subjected to such refining treatments as may be desirable, such as treatment with sulfuric acid or solvent refining with such solvents as sulfur dioxide or furfural and in some cases by treatments involving both acid treating and solvent refining. The refined stock is then subjected to solvent extraction with such solvents as acetone or furfural to produce an extract fraction containing the constituents which are more susceptible to the catalytic treatment and a raffinate fraction containing constituents which are less susceptible to such treatment. The extract fraction is subjected to the catalytic treatment as herein described and resultant products of the catalytic treatment are blended with the raffinate or with other lubricating oil to increase the oxidation stability thereof. Preferably the products of the catalytic cracking are subjected to vacuum distillation to remove low-boiling constituents and the stripped product of desired viscosity is then blended with the raffinate or other lubricating oil.

Although a preferred embodiment of the invention has been described herein, it will be understood that various changes and modifications may be made therein, while securing to a greater or less extent some or all of the benefits of the invention, without departing from the spirit and scope thereof.

I claim:
1. In the manufacture of lubricating oil of superior oxidation stability the process that comprises subjecting a distillate lubricating oil to treatment with a solvent selected from the group consisting of acetone and furfural to thereby form a raffinate fraction and an extract fraction characterized in being more susceptible of improvement in oxidation stability by catalytic treatment than the raffinate, treating the extract fraction with activated clay at a temperature of upwards of 600° F. and not in excess of 750° F. with a contact time of the order of ½–2 hours to thereby effect conversion into constituents which inhibit oxidation and blending resultant products of conversion containing the inhibiting constituents with distillate lubricating oil to thereby increase the oxidation stability thereof.

2. In the manufacture of lubricating oil of superior oxidation stability the process that comprises subjecting a refined distillate lubricating oil, to treatment with acetone to thereby form a raffinate fraction and an extract fraction characterized in being more susceptible of improvement in oxidation stability by catalytic treatment than the raffinate, treating the extract fraction with activated clay at a temperature of upwards of 600° F. and not in excess of 750° F. with a contact time of the order of ½–2 hours to thereby effect conversion into constituents which inhibit oxidation and blending resultant products of conversion containing the inhibiting constituents with the raffinate to thereby increase the oxidation stability thereof.

FRED C. TOETTCHER.

REFERENCES CITED

The following references are of record in the file of this patent:

UNITED STATES PATENTS

| Number | Name | Date |
|---|---|---|
| 1,547,682 | Prutzman | July 28, 1925 |
| 1,655,175 | Benjamin | Jan. 3, 1928 |
| 1,766,338 | Johnston | June 24, 1930 |
| 1,786,493 | Isom et al. | Dec. 30, 1930 |
| 1,813,628 | Lowery et al. | July 7, 1931 |
| 1,856,934 | Stafford | May 3, 1932 |
| 1,884,587 | Darlington | Oct. 25, 1932 |
| 1,885,524 | Lazar | Nov. 1, 1932 |
| 1,898,168 | Belden | Feb. 21, 1933 |
| 1,970,796 | Beiswenger | Aug. 21, 1934 |
| 2,117,602 | Bulkley | May 17, 1938 |
| 2,195,659 | Shoemaker | Apr. 2, 1940 |
| 2,218,133 | Lovell et al. | Oct. 15, 1940 |
| 2,222,475 | Brandt | Nov. 19, 1940 |
| 2,247,475 | Bray et al. | July 1, 1941 |
| 2,273,147 | Schumacher et al. | Feb. 17, 1942 |
| 2,341,874 | Lovell | Feb. 15, 1944 |
| 2,356,952 | Smith | Aug. 29, 1944 |
| 2,420,108 | Stratford | May 6, 1947 |